Aug. 27, 1929.                H. C. HOWER                1,726,026
                                 TIRE
                         Filed Feb. 23, 1928        2 Sheets-Sheet 1

Inventor
Harry C. Hower.

Aug. 27, 1929.  H. C. HOWER  1,726,026
TIRE
Filed Feb. 23, 1928  2 Sheets-Sheet 2
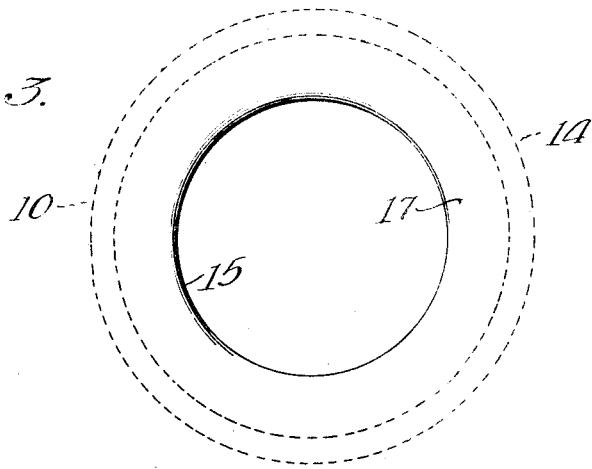
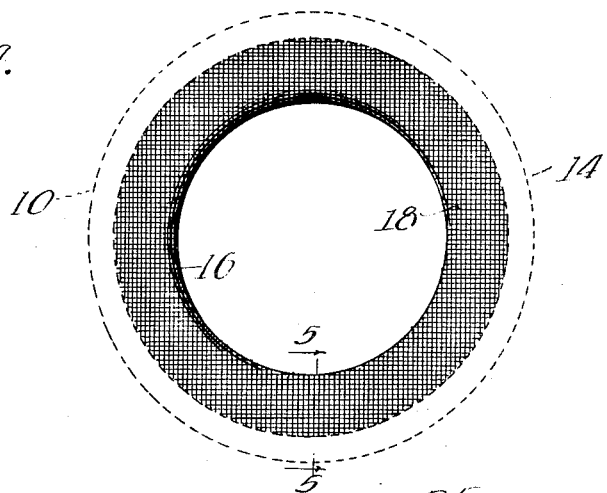
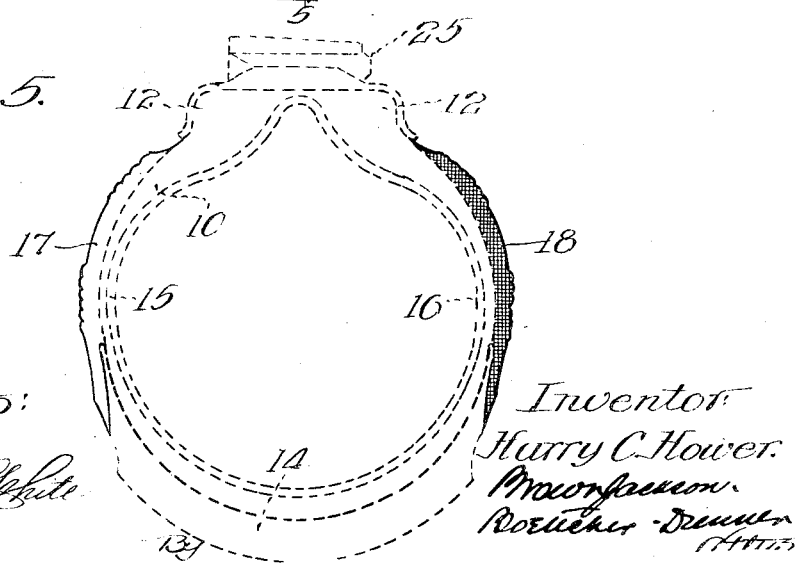

Patented Aug. 27, 1929.

1,726,026

UNITED STATES PATENT OFFICE.

HARRY C. HOWER, OF CHICAGO, ILLINOIS.

TIRE.

Application filed February 23, 1928. Serial No. 256,192.

This invention relates to tires, more particularly to pneumatic automobile tires, and its object is to provide a generally improved and simple tire construction that will meet conflicting demands and requirements of use as well as the different tastes of different purchasers.

With the increasing attention to appearance in present day automobiles, tires having white or light colored side walls have become quite popular. Where both sides of the tire are white or light colored, however, I find that the sides which are presented inwardly on the automobile are particularly subject to being splashed with oil or soiled from the operating mechanism of the car. This decreases the esthetic effect or pleasing appearance provided by tires of this sort and, although the outer sides are easily accessible and readily cleaned, I find that access to the inner sides is difficult and the matter of cleaning the inner sides is quite a problem. I also find that some purchasers, because of taste or requirements, still prefer black or darker colored tires, and this conflict in taste has made it necessary for dealers to stock up with and for the manufacturers to make white or light colored and black or dark colored tires. This is a burden or handicap, particularly where the number of different sizes or grades is relatively large. Even aside from the objection from soiling, where the inner side of the tire is white, it will form a white background for any operating parts disposed in front of these white inner sides in the line of vision thereof, and this may direct attention to parts which may impair or detract from the esthetic effect or appearance of the car as a whole.

I have, according to the present invention, devised a tire which involves greatly increased utility. I make one side of the tire of black or relatively dark color and the opposite side of white or relatively light color. This reduces the problem of manufacturing and stocking the tires to meet different proportions of conflicting tastes and increases the utility of the tire by enabling the satisfaction of either of one of two conflicting tastes with the same tire where heretofore two tires have been necessary to satisfy either one of two different tastes. These black and white side walls sustain substantially equal wear and loads and cooperate jointly in taking the wear and sustaining the load imposed upon the tire. Where the purchaser prefers black or dark colored tires, the tires may be mounted upon the wheels with the black or dark colored sides presented outwardly and simply by reversing the tires to present the white or lighter colored sides outwardly, persons preferring white or light colored tires may be satisfied.

As already pointed out, this increases the utility of the tire and decreases the stock which dealers have been heretofore required to carry and it reduces in the manufacture of the tires any problem of gauging the relative proportions of the demand for the two different types of tires. The burden of the dealer or distributor is reduced, the problem of manufacture is simplified, and at the same time the amount of storage space required is decreased. The turnover also takes less time with a resulting decrease in the time that the tires are on the dealer's hands and a fresher or better condition of the rubber to the purchaser. In addition, where the black or darker sides are presented inwardly, they will not show oil or other soil and they will not center or direct attention to parts which may impair or detract from the appearance of the car. Instead, these black or darker inner sides will tend to suppress any such parts with a resulting concentration upon the outer white or lighter colored sides.

The present invention meets, with a single tire, the conflicting demands and requirements of use, as well as the different tastes of different purchasers which have heretofore been met with two entirely separate and different tires. The means provided comprises a white or relatively light colored wall on one side of the tire and a black or relatively dark colored wall on the other or opposite side, these walls, and thereby the means providing the increased utility, sustaining substantially equal wear and loads and cooperating jointly in taking the wear and sustaining the loads imposed upon the tire.

The invention is illustrated in the accompanying drawings, in which:—

Fig. 3 is a side elevational view of one side of the tire with the tread in dotted lines;

Fig. 4 is a view similar to Fig. 3 showing the opposite side of the tire; and

Fig. 5 is a more or less illustrative transverse section taken on the line 5—5 of Fig. 4 and showing an illustrative carcass and tread in dotted lines with the outer side surfaces or flanking strips in full lines.

Figure 1:
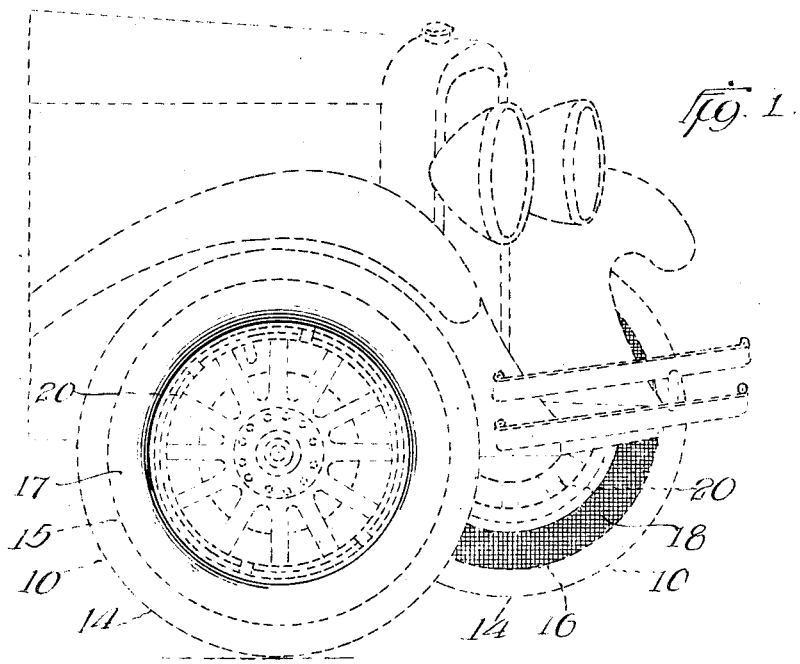
Fig. 1 is a fragmentary perspective view showing in dotted lines the front of an automobile and in full lines a pair of tires embodying the present invention positioned thereon with their white or relatively light colored sides presented outwardly.

Referring to the drawings, the tire shown in Fig. 5 comprises any existing or preferred carcass indicated generally in dotted lines at 10. The carcass 10, which is usually of rubber and textile or fabric construction, has beads 12 and a tread 14. The beads 12 and tread 14 may be of any suitable or preferred construction, and I have therefore simply shown the same illustratively in dotted lines. Except as hereinafter pointed out, they may be varied as desired. The opposite side walls of the tire are indicated at 15 and 16, and the outer surfaces of these side walls 15 and 16 are indicated at 17 and 18, respectively. These outer surfaces 17 and 18 may be formed by flanking strips suitably secured over and covering the sides of the tire, as shown.

Figure 2:
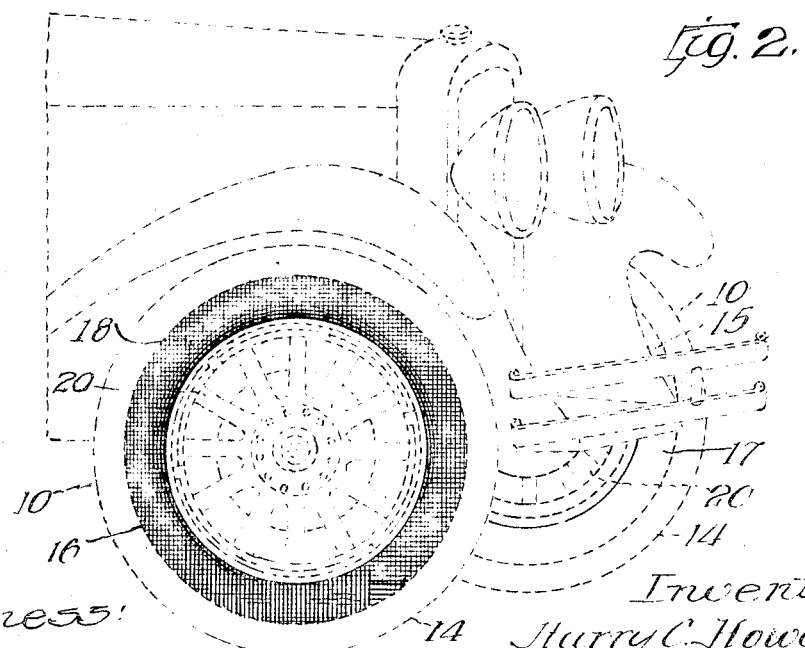
Fig. 2 is a view similar to Fig. 1 showing the tires of Fig. 1 reversed to present the white or lighter colored sides inwardly and the black or darker colored sides outwardly.

According to the present invention, I make the side surfaces 17 and 18 of different colors to provide, in one position of the tire on the car, an improved outward appearance with increased inward utility and, by reversal of the tire upon the wheel, I provide a different outward appearance with the further increased utility of meeting the different tastes of different purchasers. Although the particular color combination may, of course, be varied, one of the side surfaces 17, 18, for example the surface 17, is preferably white or of relatively light color, and the other or opposite surface 18 is preferably black or of a relatively dark color. By making the opposite sides of the tires of different colors by the use of flanking strips as shown, the oppositely different colored sides are embodied in the original construction of the tire with the manufacturing and distributing advantages obtained thereby. The different colorings preferably extend through the entire thicknesses of the flanking strips but this might vary. As above pointed out, so far as I am now aware, the color combination may be varied, but the white coloring on one side with the black or relatively dark coloring on the opposite side meets the present two dominating classes of tastes, and this combination has a utility in use that may be absent in at least some other color combinations.

Where the purchaser prefers black or dark colored tires, the tires of the present invention are mounted upon the wheels 20 with the black or dark sides 18 presented outwardly as shown in Fig. 2. Where the purchaser prefers white or relatively light colored tires, the tires are reversed upon the wheels 20 to present the white or relatively light colored sides 17 outwardly, as shown in Fig. 1. Where the white or light colored sides 17 are presented outwardly, as shown in Fig. 1, the black or dark colored sides 18 are presented inwardly. This inward presentation of the black or dark sides 18, simultaneously with the outward presentation of the white or light colored sides 17, provides the white or light colored outward appearance and the inner black sides have the simultaneous utility or function of suppressing any operating or other parts which are disposed in the lines of vision of these inner sides of the tires and which may, without this accompanying suppressing thereof, impair or detract from the esthetic effect or appearance of the car as a whole. At the same time, where the black or darker sides are presented inwardly, they will not show oil or other soil from the operating mechanism of the car, and the problem of access to these inner sides for the purpose of cleaning and maintaining them clean will be avoided.

The present tire meets two different classes of requirements and satisfies the tastes of what have heretofore been two different classes of purchasers or users. This further increases the utility and decreases the stock which dealers or distributors have heretofore been required to carry. Where the white sides 17 are presented outwardly the dark sides 18 cooperate with the white outward presentation to mask any operating or other parts, for example beneath the chassis of the vehicle and in the lines of vision of the inner sides of the tires. This concentrates attention on the white outer sides and provides the white outward presentation without emphasizing or directing attention upon any operating or other parts, for example depending from the chassis of the vehicle, and which might impair or detract from the esthetic effect or appearance provided by the outward presentation of the white sides 17. The non-soiling utility of the darker or black inner sides also cooperates simultaneously with the white outward presentation and the white and black sides 17 and 18 of each tire sustain substantially equal wear and loads, and these opposite white and black sides of each tire cooperate jointly in taking the wear and sustaining the loads imposed upon the tire. The tread 14 may be colored as desired, preferably black or dark colored, or preferably according to the practice now employed in connection with tires having both sides white or of light color, or both sides black or relatively dark colored. This may, however, be varied as desired within the spirit and scope of the present invention. It is to be understood, of course, that the tire is detachably mounted upon the wheel felloe, indicated generally at 25, as by means of a suitable demountable rim which may be taken off with the tire and reversed to reverse the position of the tire upon the wheel, or, of course, the tire may be removed from the rim and reversed separately or independently of the rim to reverse its position upon the wheel. The demountable rim may be of any suitable or preferred type or construction and may be provided with detachable side and locking rings, as well understood in the art.

The present invention has particular utility in connection with low pressure tires of the "balloon type", in which the side walls are of increased or relatively great area as compared with the walls of the previously existing high pressure tires. The invention is not limited, however, to "balloon" tires, but may be embodied in high pressure or other tires.

I claim:—

As a new article of manufacture, a pneumatic tire having opposite side walls, one side wall of dark rubber material and the opposite side wall of light colored rubber material and both embodied in the original construction of the tire, and a tread portion disposed circumferentially of the tire and between the opposite sides, said tread substantially concealing the light colored side from one side of the tire and presenting a contrast with the light colored side from the opposite side of the tire.

In witness whereof, I hereunto subscribe my name this 20th day of February, 1928.

HARRY C. HOWER.